(12) United States Patent
Tyan et al.

(10) Patent No.: US 6,168,901 B1
(45) Date of Patent: Jan. 2, 2001

(54) RECORDABLE OPTICAL ELEMENT USING LOW ABSORPTION MATERIALS

(75) Inventors: Yuan-Sheng Tyan, Webster; Pranab K Raychaudhuri, Rochester; Kee-Chuan Pan, Pittsford; George R Olin, Webster, all of NY (US)

(73) Assignee: Eastman Kodak Company, Rochester, NY (US)

( * ) Notice: Under 35 U.S.C. 154(b), the term of this patent shall be extended for 0 days.

(21) Appl. No.: 08/399,787

(22) Filed: Mar. 7, 1995

Related U.S. Application Data

(63) Continuation-in-part of application No. 08/121,801, filed on Sep. 15, 1993, now abandoned, which is a continuation-in-part of application No. 08/002,001, filed on Jan. 8, 1993, now abandoned.

(51) Int. Cl.$^7$ ........................................................ G11B 7/24
(52) U.S. Cl. ................ 430/270.13; 430/945; 430/273.1; 430/275.1; 428/64.5; 428/64.4; 369/288; 369/275.2
(58) Field of Search ..................................... 430/270, 271, 430/273, 275, 495, 945, 346, 270.13, 270.1, 273.1, 275.1, 495.1; 428/64, 65, 913, 914, 64.5, 64.4; 346/135.1

(56) References Cited

U.S. PATENT DOCUMENTS

| 4,940,618 | 7/1990 | Hamada et al. ........................ 428/64 |
| 4,985,349 | 1/1991 | Ohkawa et al. ....................... 430/495 |
| 5,242,784 | * 9/1993 | Chew et al. .......................... 430/945 |
| 5,273,861 | * 12/1993 | Yamada et al. ...................... 430/275 |
| 5,294,523 | * 3/1994 | Nagata et al. ....................... 430/495 |

FOREIGN PATENT DOCUMENTS

| 2005520 | 6/1990 | (CA) . |
| 0290009 | 9/1988 | (EP) . |
| 0353393 | 4/1989 | (EP) . |
| 1134437 | * 5/1989 | (JP) . |
| 171289 | 7/1990 | (JP) . |

OTHER PUBLICATIONS

Translation of JP 1–137437 (Kuroiwa et al.)(Publ. May 1989).*
Hamada et al., "CD–Compatible write once disc with high reflectivity" SPIE 1078 (1989) pp. 80–87.*
*Optical Recording*, Allan B. Marchant (1990) pp 343–371.

* cited by examiner

*Primary Examiner*—Martin Angebranndt
(74) *Attorney, Agent, or Firm*—Raymond L. Owens

(57) ABSTRACT

There is disclosed a recordable optical element that has a substrate and on the surface of the substrate, a recording layer and a light reflecting layer. The recording layer has a material with the formula $$Te_aGe_bC_cH_dO_e$$

wherein a, b, c, d, and e are atomic percents and (c+d)>40, d>10, a>5, b>5, and e≧0 such that a+b+c+d+e=100; and the reflecting layer and the recording layer being selected such that the element $R_{max}$ or $R_{min}$ (element reflectivity) is about or greater than 70% at about 780 nm.

4 Claims, 4 Drawing Sheets

RECORDABLE OPTICAL ELEMENT USING LOW ABSORPTION MATERIALS

CROSS-REFERENCE TO RELATED APPLICATION

This application is a continuation-in-part of commonly assigned U.S. application Ser. No. 08/121,801 filed Sep. 15, 1993, entitled "Recordable Optical Element Using Low Absorption Materials" by Tyan et al, now abandoned, which is a continuation-in-part of U.S. application Ser. No. 08/002,001 filed Jan. 8, 1993, entitled "Recordable Optical Element Using Low Absorption Cermet Materials" by Tyan et al, now abandoned.

FIELD OF THE INVENTION

The present invention relates to optical recording elements, particularly to those that are useful as recordable compact disks.

BACKGROUND OF THE INVENTION

There are many types of optical information carrying elements that are known. One of the popular forms of optical information containing element is the compact disk or CD. Digital information is stored in the form of low reflectivity marks or pits on an otherwise reflective background. Stringent specifications on CD formats have been published by Sony and Philips, and these formats are used as standards throughout the world. One of the most important format requirements is the background reflectivity which is specified to be greater than 70% at about 780 nm. This high reflectivity value is unusual when compared with other optical recording disks. In the latter case, the reflectivity normally is designed to be low in order to improve the absorption of the writing laser power to facilitate the information recording process.

In CD's, the optical information is most often in the form of read only memory or ROM. Optical information is usually not recorded in real time but rather is produced by press molding. In a typical process, the recording substrates are first mass produced by press molding using a stamper containing the digital information to be reproduced. The press molded substrate is then overcoated with a reflective layer and then with an optional protective layer. In those areas having the deformations or pits, the reflectivity is lower than in those areas not have the deformations.

It is desirable to produce optical recording elements which are capable of being recorded in real time and producing a record that mimics the conventional CD on read out. In this manner, information can be added to the CD and the CD can be used on a conventional CD player.

It has been difficult to produce such optical recording elements because the recorded elements have to meet the strict specifications for CD. In particular, it has been difficult to produce recordable elements that will meet the >70% reflectivity requirement.

One method for forming a recordable element that mimics conventional mold pressed CD elements is to provide a transparent, heat deformable support having thereon, in order, a layer that absorbs recording radiation and a reflective layer. When radiated through the transparent support, the reflectivity varies with the thickness of the absorbing layer as a result of the light interference effect (FIG. 1). When an absorbing layer of very small thickness (much less than that corresponding to $R_{min}$) is used, the reflectivity is high, but such structure is not useful for recording purposes because of low thermal efficiency. The reflective layer is a very effective heat sink. Most of the writing energy absorbed next to the reflector in the recording layer is conducted away by the reflector. It is generally observed that the smallest useful thickness is that which produces reflectivity in the neighborhood of the first minimum in reflectance. To produce useful recording elements, therefore, requires materials which will produce >70% reflectance with thickness larger than this minimum useful thickness. Such materials are characterized by low optical absorption coefficients, contrary to the materials used in conventional recording structures where high optical absorption is needed. These low absorption materials when used in conventional media structure without a reflector generally do not perform well. Adequate sensitivity and contrast can only be achieved when incorporated in a complete optical interference structure using the reflector. Thus, generally speaking, materials that are appropriate for conventional recording structure are not appropriate for recordable CD structure, and vice versa.

Materials of this type based on organic dyes are described in U.S. Pat. No. 4,940,618, European Patent Application 0,353,393, and Canadian Patent 2,005,520.

One of the undesirable features of elements based on such organic dyes is their wavelength sensitivity. The desirable optical properties can only be obtained at wavelengths near the absorption edges of such dyes. As a result, the reflectivity and other properties of such elements depend strongly on wavelength. It is very difficult to meet all the stringent CD specifications throughout the entire range of wavelengths that the CD's are designed to function. It is nearly impossible to operate such elements using shorter wavelengths which are to be used in future generation CD's to increase the recording density.

SUMMARY OF THE INVENTION

Thus, it is an object of this invention to provide a recording element that has high reflectivity, recording sensitivity, and contrast to meet the CD specifications over a wider wavelength range.

This object is achieved by a recordable element having a substrate and on the surface of the substrate, a recording layer and a light reflecting layer, the improvement comprising:

a) a recording layer including material given by the formula

$(Te_aGe_bC_cH_dO_e)$, a, b, c, d, and e are atomic percents and (c+d)>40, d>10, a>5, b>5, and e≧0 such that a+b+c+d+e=100; and b) the reflecting layer and the recording layer being selected such that the element $R_{min}$ or $R_{max}$ (element reflectivity) is about or greater than 70% at about 780 nm.

DETAILED DESCRIPTION OF THE INVENTION

Figure 1:
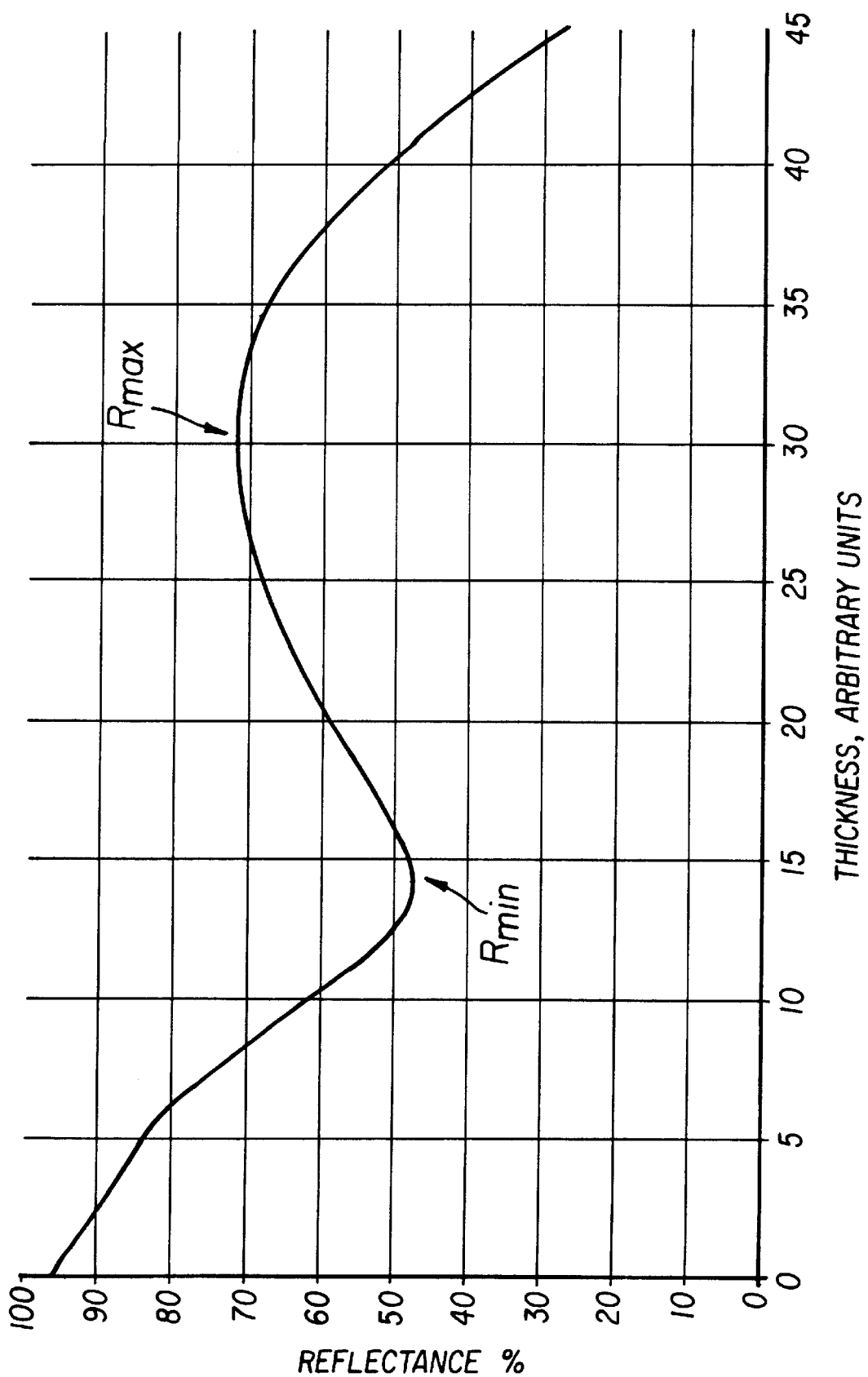
FIG. 1 is a plot of the reflectivity vs. the thickness of the optical recording element resulting from the light interference effect.

It is an important feature of the present invention that the reflecting layer and the recording layer of the element being selected such that the element $R_{min}$ or $R_{max}$ (element reflectivity) is about or greater than 70% in order to meet the CD specifications. The terms $R_{min}$ and $R_{max}$ are well understood in the art. In FIG. 1 is shown a representative curve of reflective vs. thickness for an optical element with a reflector at an arbitrary wavelength of light. The units on thickness are arbitrary. The curve is somewhat representative of all such materials in that the reflectivity starts high and then goes down to a minimum called $R_{min}$ due to destructive optical interference and then returns to a maximum point $R_{max}$ due to constructive optical interference. As shown for any given optical element, $R_{max}$ is always greater than $R_{min}$. With optical elements, the thickness is generally selected to be at $R_{max}$, although it has been found that, in accordance with the invention, the thickness can be at or near $R_{min}$. With reference to FIG. 1, the term $R_{min}$ means the reflectivity value at about 14 thickness units (arbitrarily chosen) where optical interference causes a local minimum in the reflectivity-vs.-thickness curve; $R_{max}$ in this example is at about 30 thickness units where optical interference causes a local maximum in the reflectivity-vs.-thickness curve. Those skilled in the art will recognize that reflectivities can be measured by spectrophotometers.

Figure 2:
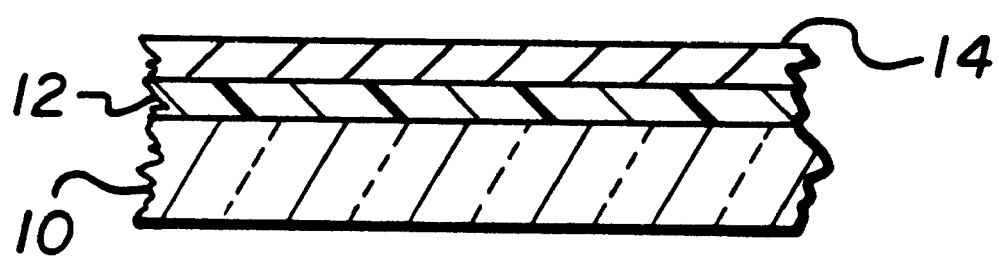
FIG. 2 is a schematic representation, in cross-section, of one element in accordance with the invention.

Optical elements according to this invention are shown in FIG. 2 include at least three layers. The substrate 10 has thereon, an optical recording layer 12, and a reflective layer 14. Protective layers may also be used but will not be discussed since they are not necessary for the practice of this invention. The substrate is transparent and light which illuminates the recording layer 12 passes through the substrate 10.

Recording is accomplished by marking the recording layer 12 with a write laser focused on the recording layer 12. The focused laser beam heats the recording layer to temperatures substantially above the room temperature and induces changes in the media. The likely changes may include agglomeration of the metallic components in the layer, or the dissociation of material to form gaseous species which, in turn, causes the deformation of the media package in the form of bubbles, voids, or pits, etc. Some distortion of the substrate material might also be induced. In any event, the combination of some or all of these changes forms marks which can then be read back by the focused read laser beam. The record thus consists of marks of relatively low reflectivity on a background of relatively high reflectivity in relation to the read laser light.

The preferred embodiment of the invention is that of a writable compact disk (CD) as shown in FIG. 2. The write and read lasers are of the laser diode type and generally operate in the infrared region between 770 and 830 nm.

For a more complete explanation of the optical recording and play back processes as well as the construction of compact disks, see *Optical Recording*, Allan B. Marchant (1990).

The Substrate 10

The substrate 10 can be made from optically transparent resins with or without surface treatment. The preferred resins for the FIG. 2 embodiment are polycarbonate and polyacrylates. The substrate 10 may include a guide groove for laser tracking.

The Reflective Layer 14

The reflective layer can be any of the metals conventionally used for optical recording materials. Useful metals can be vacuum evaporated or sputtered and include gold, silver, aluminum, copper, and alloys thereof. Gold is the preferred material.

The Recording Layer or Film 12

The present invention uses a recording layer given by the formula

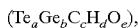

$(Te_aGe_bC_cH_dO_e)$, wherein a, b, c, d, and e are atomic percents and (c+d)>40, d>10, a>5, b>5, and e≧0 such that a+b+c+d+e=100, the reflecting layer and the recording layer being selected such that the element $R_{min}$ or $R_{max}$ (element reflectivity) are about or greater than 70% at about 780 nm.

The preferred method of fabrication for the recording layer is DC sputtering. The preferred target contains both the Te and Ge. The targets can be prepared by melt casting or powder metallurgy techniques. Alternatively, a co-sputtering method can be used where two or more sputtering targets are used, some contain the metal and some Ge. The atmosphere should contain a sputter gas such as Ar or Kr, and a hydrocarbon gas such as methane. Useful films can also be prepared using other gases such as fluorides, $H_2$, $N_2$, and $NH_3$.

Films containing Ge, Sb, Te, C, and H have been fabricated for optical applications (Okawa Japanese Kokai 171, 289 (1990), U.S. Pat. No. 4,985,349, and European Patent Application 0290009 (1988)). These films were designed, however, to be used for a recording layer without reflectors. For such applications, it is desirable to have films which are highly absorbing. For example, Okawa teaches the use of films made with Q<35%, where Q=$CH_4$/(Ar+$CH_4$) is the fraction of $CH_4$ in the sputter gas. Okawa in European Patent Application 0290009 (1988) reported that for a film fabricated with Q=50% and any of the metals in a long list including Te, Ge, and Sb, the COMPLEX optical index is about 3.7–0.59i. That film, if incorporated in a structure as in FIG. 2, gives only 5.6% reflectance at the first interference minimum and 44.5% reflectance at the first maximum. These low reflectivity values are inadequate for CD applications. Films made with lower Q values such as those suggested by Okawa are said to be even more absorbing and obviously even less suitable for CD applications. Furthermore FIG. 4 of U.S. Pat. No. 4,985,349 clearly indicated that it was not possible to produce films with (C+H) content higher than 40 atomic % even when a sputtering atmosphere consisted entirely of $CH_4$ (i.e., Q=100%). One skilled in the art will conclude from these teachings, therefore, that it is not possible to produce Ge+Te+Sb+C+H films with optical constants suitable for CD applications even when a reflector is applied.

Quite surprisingly, (C+H) content of over 40% can not only be produced using Ge and Te as the components, but for those films that contain more than 40% of (C+H), the optical properties are such that >70% reflectance can be obtained using a structure as represented in FIG. 2, using a gold reflector, and a film thickness corresponding to the first maximum of the interference curve. When (C+H) is over 50%, >70% reflectance can be obtained even using a thickness corresponding to the first minimum of the interference curve. In addition to adequate reflectivity, such films in the described structure with a gold reflector also demonstrated high recording sensitivity and contrast. The same films, on the other hand, cannot be recorded with adequate sensitivity or contrast if the reflector is not used. These films will be considered inappropriate for single layer optical recording media applications.

Figure 3A:
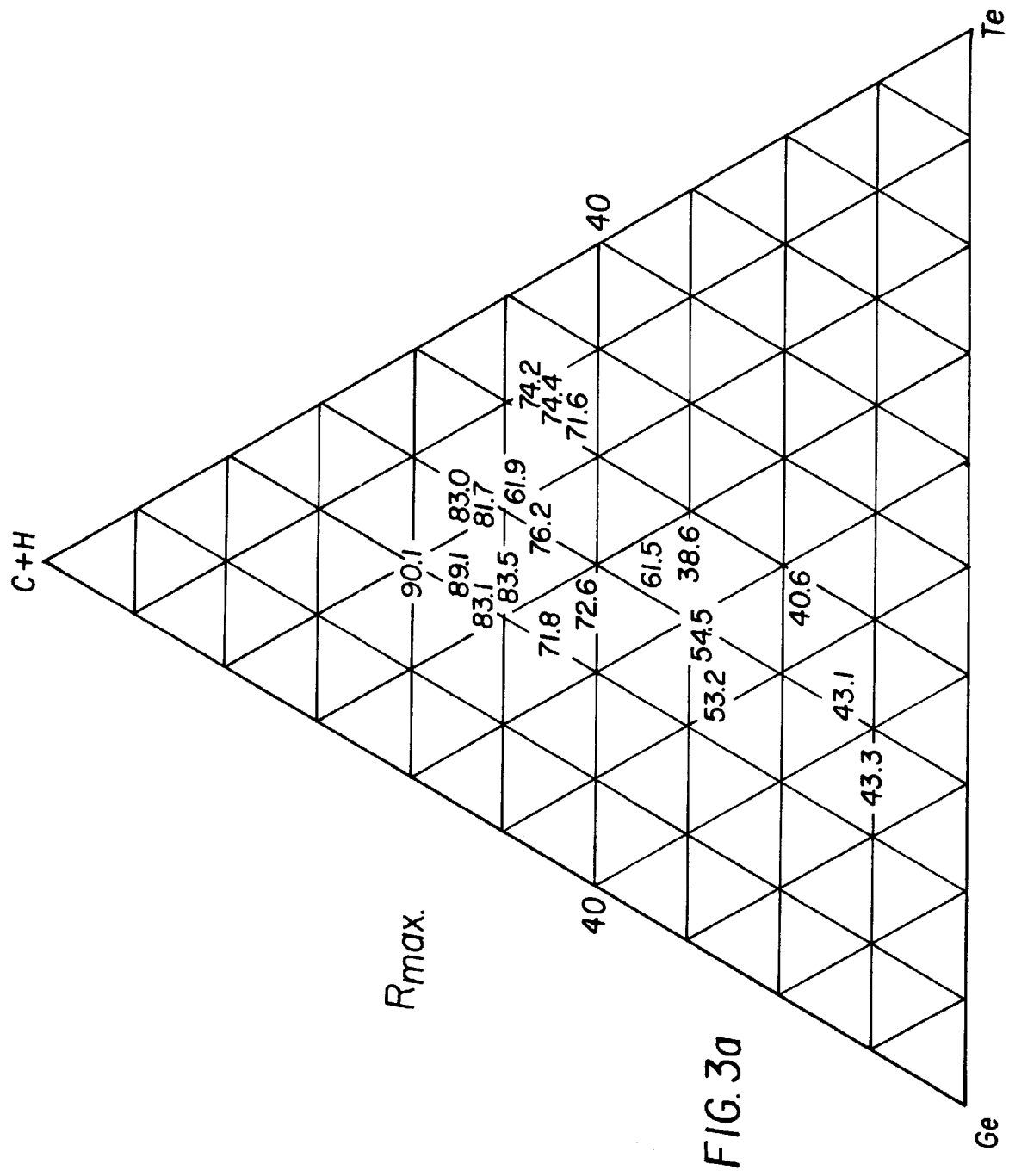
FIGS. 3a and 3b are representations where $R_{min}$ and $R_{max}$ (R is the reflectivity) values are shown as functions of element compositions.
Figure 3B:
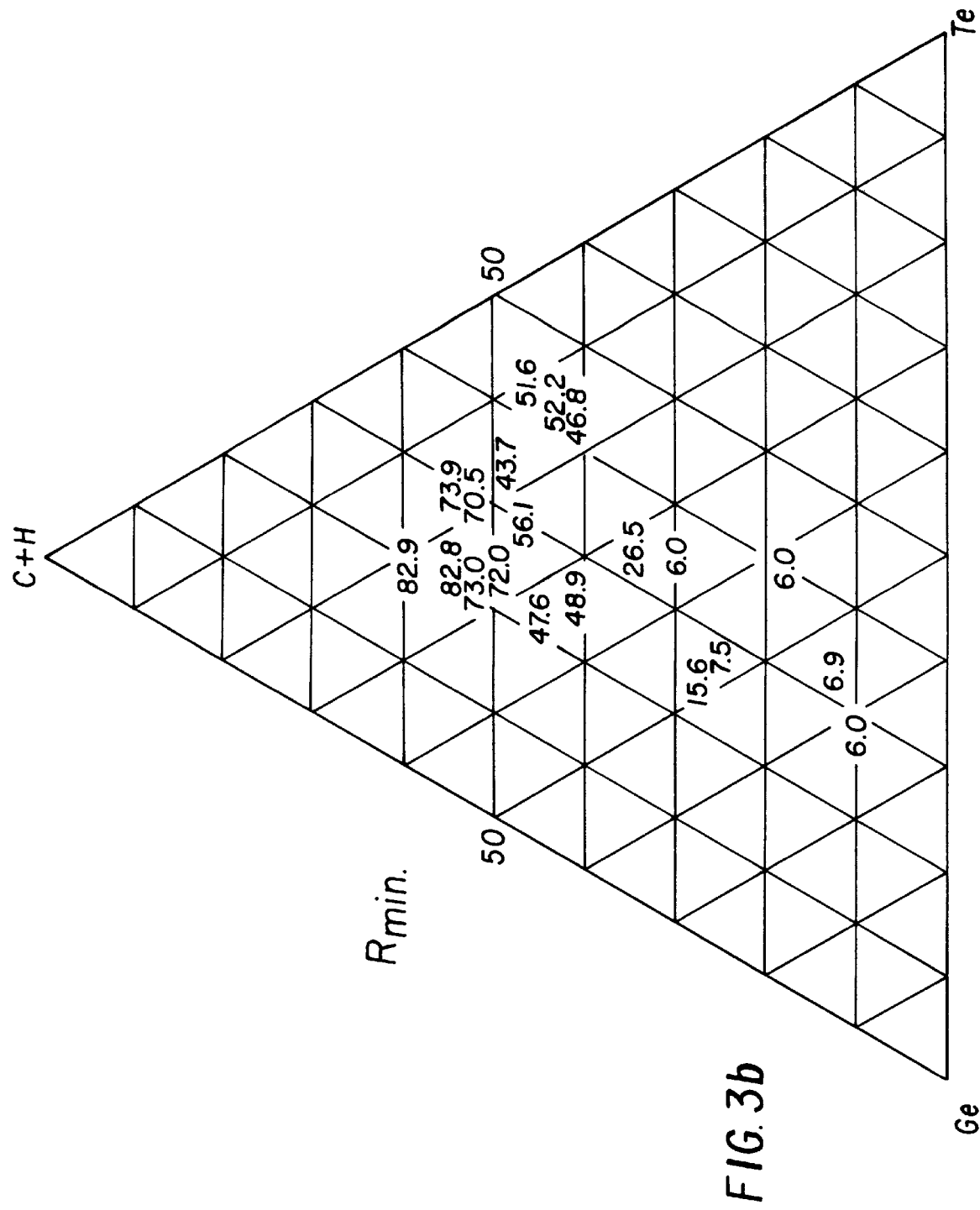

FIGS. 3a and 3b are standard mixture plots which show, respectively, $R_{max}$ and $R_{min}$ for recording materials of different compositions, but which have a reflective layer in the optical element. For example, in FIG. 3a, there is a reflectivity value of 90.1% for a material which has 60% of (C+H); 20% Ge; and 20% Te. Similarly, for the point having a reflectivity of 40.6% has 20% (C+H); 40% Ge; and 40% Te. These plots in FIGS. 3a and 3b show plots of actual materials. One can select from these plots the compositions of the materials which will provide the appropriate reflectivities in accordance with this invention. As has been pointed out, it is required that the reflectivities for either $R_{max}$ or $R_{min}$ be at or above 70%.

EXAMPLE 1

A $Ge_{40}Te_{60}$ sputtering target was used. The power was 40 Watts. The pressure was 4.64 mTorr, at a flow rate of 20 SCCM Ar and 20 SCCM $CH_4$. An approximately 1800 Å film was deposited onto a polycarbonate disk substrate. Then, a gold reflector layer was sputter deposited and an organic lacquer protective layer was spin coated.

A recording experiment was performed using a 788 nm write and read laser, at a speed of 2.8 m/s. The recording power at the second harmonic minimum was 7 mW. The reflectivity was 75% and the $I^{11}/I_{top}$ was 0.64. The recording layer was analyzed by Rutherford backscattering and the composition was Te 31%, Ge 21%, O 1%, C 22%, and H 25%.

EXAMPLE 2

A thin film was deposited on polycarbonate disk substrate by co-sputtering Te and Ge in $CH_4$ containing atmosphere. The target powers were 7 and 50 Watts for Te and Ge, respectively, and the flow rates were 20 and 7.5 SCCM for Ar and $CH_4$, respectively at a total pressure of 8.78 mTorr. The film was deposited and a gold reflector layer was sputter deposited and an organic lacquer protective layer was spin coated.

A recording experiment was performed as in the example above. The recording power at the second harmonic minimum was 11 mW. The reflectivity was 74.8%, and the $I_{11}/I_{top}$ was 0.77.

EXAMPLE 3

A thin film was deposited on a polycarbonate disk substrate by co-sputtering Te and Ge in $CH_4$ containing atmosphere. The target powers were 12 and 50 Watts for Te and Ge, respectively, and the flow rates were 20 and 7.5 SCCM for Ar and $CH_4$, respectively at the total pressure of 8.76 mTorr. The film was deposited and a gold reflector layer was sputter deposited and an organic lacquer protective layer was spin coated.

A recording experiment was performed as in the examples above. The recording power at the second harmonic minimum was 15 mW. The reflectivity was 77.3% and the $I_{11}/I_{top}$ was 0.80.

EXAMPLE 4

A thin film was deposited on polycarbonate disk substrate by co-sputtering Te and Ge in $CH_4$ containing atmosphere. The target powers were 14 and 50 Watts for Te and Ge, respectively and the flow rates were 20 and 7.5 SCCM for Ar and $CH_4$, respectively at the total pressure of 8.76 mTorr. The film was deposited and then a gold reflector layer was sputter deposited and an organic lacquer protective layer was spin coated.

A recording experiment was performed as in the examples above. The recording power at the second harmonic minimum was 12.5 mW. The reflectivity was 73.1%, and the $I_{11}/I_{top}$ was 0.72.

EXAMPLE 5

Several series of (Te+Ge+$CH_4$) samples according to the structure in FIG. 2 were prepared, each series comprising samples prepared under identical conditions but with different thickness. The reflectivity of these samples were measured in order to determine $R_{min}$ and $R_{max}$, the reflectivity values at the first interference minimum and the first interference maximum, respectively. The $R_{min}$ and $R_{max}$ values are plotted against sample composition in a standard mixture plot in FIGS. 3a and 3b. Here the combined (C+H) concentration is used. These plots demonstrated that $R_{min}$ and $R_{max}$ are less than 70% for (C+H) less than 50% and 40%, respectively.

The invention has been described in detail with particular reference to certain preferred embodiments thereof, but it will be understood that variations and modifications can be effected within the spirit and scope of the invention.

Parts List
10 substrate
12 recording layer
14 reflective layer

What is claimed is:

1. A recordable element having a substrate and on the surface of the substrate, a recording layer and a light reflecting layer, the improvement comprising:

a) a recording layer including material given by the formula $(Te_aGe_bC_cH_dO_e)$, 

a, b, c, d, and e are atomic percents and (c+d)>40, d>10, a>5, b>5, and e≧0 such that a+b+c+d+e=100; and b) the light reflecting layer and the recording layer being selected such that the element $R_{max}$ (element reflectivity) is about or greater than 70% at about 780 nm.

2. The recording element according to claim 1 wherein the reflecting layer is made of Au, Ag, Cu, Al, or alloys thereof.

3. A recordable element having a substrate and on the surface of the substrate, a recording layer and a light reflecting layer, the improvement comprising:

a) a recording layer including material given by the formula $(Te_aGe_bC_cH_dO_e)$, 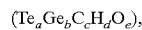

a, b, c, d, and e are atomic percents and (c+d)>50, d>10, a>5, b>5, and e≧0 such that a+b+c+d+e=100; and b) the light reflecting layer and the recording layer being selected such that the element $R_{min}$ (element reflectivity) is about or greater than 70% at about 780 nm.

4. The recording element according to claim 3 wherein the light reflecting layer is made of Au, Ag, Cu, Al, or alloys thereof.

* * * * *